(12) United States Patent
Sankey et al.

(10) Patent No.: US 6,939,584 B2
(45) Date of Patent: Sep. 6, 2005

(54) PROCESS FOR THE PRODUCTION OF COATED POLYMERIC FILM

(76) Inventors: Stephen William Sankey, 5 Hambleton Court, Great Smeaton, North Yorkshire (GB), DL62 HR; Kenneth Evans, 2 Ryedale Close, Yarm, Cleveland (GB), TS15 9UN; Mark Russell Hodgson, 2 Glendue Close, Nunthrope, Middlesbrough (GB), TS7 0QN ( * ) Notice: Subject to any disclaimer, the term of this patent is extended or adjusted under 35 U.S.C. 154(b) by 0 days.

(21) Appl. No.: 10/250,994

(22) PCT Filed: Jan. 25, 2002

(86) PCT No.: PCT/GB02/00315

§ 371 (c)(1),
(2), (4) Date: Nov. 3, 2003

(87) PCT Pub. No.: WO02/059186

PCT Pub. Date: Aug. 1, 2002

(65) Prior Publication Data

US 2004/0067284 A1 Apr. 8, 2004

(30) Foreign Application Priority Data

Jan. 25, 2001 (GB) .............................................. 0101994

(51) Int. Cl.[7] .................................................. B05D 3/00
(52) U.S. Cl. .................................................. 427/393.5
(58) Field of Search .................................. 427/393.5

(56) References Cited

U.S. PATENT DOCUMENTS

| | | | |
|---|---|---|---|
| 3,285,766 A | 11/1966 | Barkis et al. | |
| 4,302,504 A | 11/1981 | Lansbury et al. | |
| 4,333,968 A | 6/1982 | Nahmias | |
| 4,897,235 A | 1/1990 | Rosenthal et al. | |
| 5,059,470 A | * 10/1991 | Fukuda et al. | ............... 428/142 |
| 5,378,414 A | 1/1995 | Derkach | |
| 5,888,599 A | * 3/1999 | Bradt | ......................... 428/35.7 |

FOREIGN PATENT DOCUMENTS

| | | | |
|---|---|---|---|
| GB | 1078813 | * | 8/1967 |
| GB | 2024715 A | | 1/1980 |
| JP | 54-138796 | * | 10/1979 |
| JP | 07-062211 | * | 3/1995 |
| JP | 07-316318 | * | 12/1995 |
| WO | WO 96 / 19333 | * | 6/1996 |
| WO | WO 2003 / 6229 | * | 1/2003 |

* cited by examiner

Primary Examiner—Erma Cameron

(57) ABSTRACT

A process for producing a heat-sealable polymeric film comprises the steps of:
(a) melt-extruding a substrate layer of polymeric material;
(b) stretching the substrate layer in a first direction;
(c) optionally stretching the substrate layer in a second, orthogonal direction;
(d) optionally heat-setting the stretched substrate layer;
(e) forming a heat-sealable coating layer on a surface of the substrate layer by melt-coating directly thereon a molten polymeric material; and
(f) cooling the coated substrate layer;
wherein coating step (e) is prior to step (b) or between steps (b) and (c); wherein the thickness of the coating layer is less than about 8 μm; wherein the molten polymeric material of the coating layer comprises a copolyester, and wherein the molten polymeric material comprises a copolyester.

27 Claims, 1 Drawing Sheet

PROCESS FOR THE PRODUCTION OF COATED POLYMERIC FILM

PRIORITY STATEMENT

Figure 1:
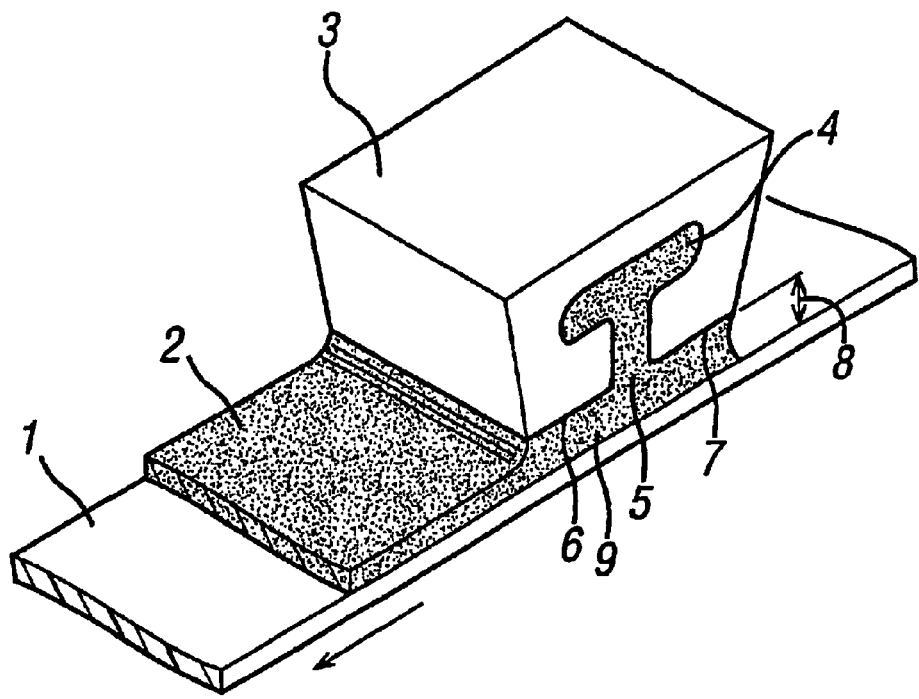

The present patent application claims priority from British 010/994.2 filed 25 Jan. 2001.

This invention relates to a coated polymeric film which is suitable for use as a lid for a container, and a process for the production thereof.

Plastic containers have been increasingly used in packaging applications, such as food packaging, and in particular for packaging convenience foods, for example ready-prepared meals which are warmed either in a microwave or a conventional oven. Often the plastic container is an APET/CPET tray (a composite material having an amorphous polyethylene terephthalate layer on top of a crystalline polyethylene terephthalate layer).

The use of plastic containers has led to a requirement for lids which can both seal the container, in order to prevent leakage of the packaged contents during storage, and also be easily peeled from the container on opening. The lids normally comprise a flexible polymeric film comprising a substrate and a sealable coating layer. Oriented polymeric film, particularly biaxially oriented polyester or polyolefin film, is most often used as the substrate for lids for containers. The seal can be formed by placing the lid on top of the container and applying heat and pressure in order to soften or melt the sealable coating layer so that it adheres to the surface of the container and forms an effective seal between the lid and the container. Unfortunately, a seal which is strong enough to prevent leakage of the contents often results in difficulties, such as tearing, upon removing the lid when the container is to be opened, i.e. a strong seal often results in poor peelability. A strong seal and easy-peeling properties, i.e. a clean peel, are required at both low, e.g. ambient, and high temperatures, e.g. after heating the packaged food contents in an oven. For the purposes of providing a heat-sealable peelable film, it is desirable to be able to control and vary the thickness of the sealable coating layer. A thinner coating layer has better peelability and is more economical but, if too thin, may not provide sufficient adhesion or prevent leakage of contents. A layer of heat-sealable coating which is too thick may cause tearing of the film on opening due to the increased heat-seal bond strength. It is also desirable to achieve a uniform coating thickness, and therefore a uniform heat-seal bond strength, across both dimensions of the film. A uniform thickness, particularly across the width of the film, also improves winding properties and general handling of the film.

An additional requirement for certain applications is that the container lid must be optically clear, i.e. it must have low haze (measured as described herein). However, compositions which provide a suitable heat-sealable peelable coating layer will not necessarily provide a clear film.

Conventionally, the sealable layer has most often been coated on the polymeric substrate in an "off-line" process, i.e. after any stretching and subsequent heat-setting employed during the manufacture of the film.

Typically, off-line application of the sealable layer has involved the use of organic solvents, which are not suitable for "in-line" coating, i.e. wherein the coating step takes place before, during or between any stretching operation(s) employed. Organic solvents can cause sticking or blocking of the film during the winding operations used during film manufacture and may be harmful, hazardous in use, or toxic and detrimental to the environment. Besides the problems of disposal of such hazardous, or toxic materials, films made in this way often contain a residual amount of the solvent, and so may not be suitable for use in applications where they come into contact with food products.

There is a commercial advantage, due to the reduction in the number of process steps employed, in being able to produce an "in-line" coated film, wherein the use of organic solvents is avoided. An in-line process also avoids the use of the further heating or drying steps which are encountered in off-line coating processes, particularly off-line solvent-coating processes. These processes can embrittle the film and deteriorate the tensile properties. In general, an in-line coated film has therefore superior mechanical properties.

WO-A-96/19333 discloses a lidding film which is produced by an in-line process which avoids the use of substantial amounts of organic solvents. The film comprises a substrate and a coating layer of a copolyester of (a) 40 to 90 mole % of at least one aromatic dicarboxylic acid, (b) 10 to 60 mole % of at least one aliphatic dicarboxylic acid, (c) 0.1 to 10 mole % of at least one dicarboxylic acid comprising a free acid group and/or a salt thereof, (d) 40 to 90 mole % of at least one glycol having from 2 to 12 carbon atoms, and (e) 10 to 60 mole % of at least one polyalkylene glycol. The coating layer is applied as an aqueous dispersion or solution, usually with a minor amount (up to about 10%) of organic solvent, either before the film substrate is stretched or between the stretching steps of a biaxial stretching process. The process disclosed in WO-A-96/19333 is limited to certain types of coating compositions, i.e. those that are soluble or adequately dispersible in water. In addition, this process is limited in respect of the achievable layer thickness because stenter ovens can remove only a certain amount of aqueous solvent; in order to operate economically the process of WO-A-96/19333 typical dry coat thicknesses are about 0.5 microns. Accordingly, the maximum heat-seal strength achievable is typically about 500–600 g/25 mm². A process for the in-line application of a heat-sealable copolyester layer from solution or aqueous dispersion is also disclosed in GB-1078813.

Heat-sealable coatings have also been applied using an in-line technique by other methods. For instance, GB-2024715 discloses the application of a polyolefinic material onto a polyolefinic substrate using an extrusion-coating technique between the longitudinal and transverse stretching operations ("inter-draw" coating). A process for the in-line inter-draw extrusion-coating of polyolefins onto a polyester substrate to produce a heat-sealable film is disclosed in GB-1077813. U.S. Pat. No. 4,333,968 discloses a method for the inter-draw extrusion coating of an ethylene-vinyl acetate (EVA) copolymer onto a polypropylene substrate to provide a heat-sealable peelable film.

Extrusion-coating is described by K. A. Mainstone in Modem Plastics Encyclopedia, 1983–84, Vol. 60, No. 10A, .Edition 1, pp195–198 (McGraw-Hill, NY) and also by Franz Durst and Hans-Günte Wagner in Liquid Film Coating (Chapman and Hall; 1997; Eds S. F. Kistler and P. M. Schweizer; Chapter 11a). The extrusion-coating process is generally used for polymers of medium or high viscosity (at least 50 Pa.s and up to about 5000 Pa.s) and generally employs an air-gap (typically about 6 inches (15 cm) between the die and the substrate. The coated substrate is passed between a heat-removing chill roller and a pressure-loaded resiliently-covered nip-roll. Typically, an extrusion-coating process is performed at a temperature of at least 300° C. and often higher. The use of an in-line extrusion-coating technique is restricted not only to polymers which have the appropriate viscosity, but also to polymers which do not lead to sticking or blocking problems in subsequent processing of the film.

Melt-coating, also known as hot melt-coating or slot-coating, is another technique that allows polymers, typically an EVA or modified-EVA melt adhesive, to be applied to a variety of substrates such as paper or polymeric film. The differences between extrusion-coating and melt-coating are described by Durst and Wagner (ibid). Typically, the coating polymer is a low viscosity, low molecular weight polymer and the coating is generally performed at a temperature of about 250° C. or below. Melt-coating equipment typically comprises a melter, coupled to a die via an insulated flexible hose. The melter consists of a hopper having heating elements at its base, which heat the polymer/adhesive to a molten state. The hopper is fed continuously by conventional means so that the melter is always "topped up", thereby minimising air ingress to the molten polymer to reduce oxidation of the molten polymer. The molten polymer is then pumped through the hose to a traditional "coathanger" die. In the traditional melt-coating process, the substrate web is pressed up against the die by a roller such that there is no air gap between the die and substrate. The roller is generally a rubber-backing roller which provides sufficient back-pressure to the die to provide an even coating layer.

An off-line melt-coating method is used, for example, in the manufacture of commercially-available pressure-sensitive adhesive tape which comprises a coating of a rubber/resin or acrylic adhesive on a cellulose film. The base film is unwound from a roller and passed through a drying oven whereupon a release coating is applied by solvent coating to the reverse side of the film to prevent sticking and handling problems during subsequent processing and wind-up. The film is then passed through a thermal oxidiser which destroys any residual amount of the solvent used to apply the release coating. The film is then coated with the molten adhesive which is applied to the film through a die. The coated film passes over a cooling drum and is wound onto a roll.

The use of a melt-coating technique is restricted to polymers which have a suitably low viscosity at the temperature of the coating operation. In general, melt-coating processes have previously been used for applying polymeric adhesive compositions, and not for polymers which can provide the required heat-seal and peeling properties suitable for films for container lids. In addition, melt-coating has generally only been used for materials which must be coated "off-line" in order to avoid sticking and handling problems during subsequent processing and wind-up.

It is an object of this invention to overcome one or more of the afore-mentioned problems. In particular, it is an object of this invention to provide an economical process for the production of a heat-sealable polymeric film, particularly a heat-sealable peelable polymeric film, wherein the use of environmentally unfriendly or toxic solvents is avoided, and wherein sticking and handling problems during subsequent processing and wind-up are avoided or reduced. It is a further object of this invention to provide a process for the production of a heat-sealable polymeric film, particularly a heat-sealable peelable polymeric film, having a continuous film coating layer of thickness less than about 8 microns. It is a particular object of this invention to provide an alternative or improved process for the production of a heat-sealable polymeric film, particularly a heat-sealable peelable polymeric film, wherein the coating layer is a copolyester. The heat-sealable peelable film should, in particular, be suitable for use as a lidding film on food containers, particularly ovenable food containers, and should preferably have good optical properties, in particular, low haze. The coating layer of the film should provide a heat-seal bond which is strong enough to prevent leakage of the contents of the container whilst retaining peelability of the film without tearing, and should preferably be of a uniform thickness over the film surface. It is also an object of this invention to provide a heat-sealable film having the aforementioned characteristics and advantages.

According to the present invention, there is provided a process for producing a heat-sealable polymeric film comprising the steps of:

(a) melt-extruding a substrate layer of polymeric material;
(b) stretching the substrate layer in a first direction;
(c) optionally stretching the substrate layer in a second, orthogonal direction;
(d) optionally heat-setting the stretched film;
(e) forming a heat-sealable coating layer on a surface of the substrate by melt-coating directly thereon a molten polymeric material; and
(f) cooling the coated substrate, wherein coating step (e) is prior to step (b) or between steps (b) and (c); wherein the thickness of the coating layer is less than about 8 $\mu$m; and wherein the molten polymeric material of the coating layer comprises a copolyester.

In a preferred embodiment of the present invention, particularly wherein the coating polyester comprises repeating units of terephthalate, the process further comprises the step of adding water to the polymeric material of the coating layer prior to the coating step. Preferably the water is added in an amount of up to about 3000 ppm, more preferably up to about 2500 ppm, more preferably up to about 2000 ppm, and most preferably up to about 1600 ppm by weight of the copolyester of the coating layer. Preferably the water is added in an amount of at least 500 ppm, more preferably at least 600 ppm, more preferably at least 1000 ppm, and most preferably at least 1300 ppm by weight of the copolyester of the coating layer. The water may be added by allowing the polymer to absorb a controlled amount of atmosphere moisture, or by adding a known quantity of water to the polymer chip. In either case, it is pragmatic to start with dry polymer and then condition the polymer to the desired water content. The preferred method is to pass air of a known humidity and temperature through a vessel containing the polymer, for a predetermined duration. Measurements of the moisture uptake by the polymer can be readily calculated by standard analytical techniques.

In conventional processes, it is generally a-requirement to dry a polyester or-copolyester prior to processing and film manufacture, since it is known that the polymer is susceptible to hydrolytic degradation induced by absorbed atmospheric water. It has been reported that failure to dry the polymer prior to coating may result in bubbles in the polymer melt and a loss of melt strength, which is a major disadvantage in the manufacture of articles which require high mechanical strength (e.g. fibres, films or bottles).

The inventors have found that if there is insufficient water in the coating composition, the melt-coatability of the copolyester becomes very difficult and/or the heat-seal bond is too strong for peelability. If the copolyester comprises too much water, causing excessive degradation of the polymer chain, then the heat-sealability of the coating layer becomes inadequate, and the finished film may also exhibit undesirable "bloom" (a white residue within or on the surface of the film). In its preferred embodiment, the invention therefore provides a method of coating, specifically melt-coating, a wide range of commercially available copolyesters which would not otherwise have been possible because of their relatively high viscosity and hydrolytic instability.

The control of the moisture content allows the subsequent hydrolytic degradation of the copolyester to be controlled to a point which-can be determined theoretically because of the known statistical nature of the reaction. It is the inventors' belief that the upper limit for the water content of the copolyester should be such that the copolyester retains an average molecular weight above its critical molecular weight, which is defined as the molecular weight below which the viscosity is directly proportional to the polymer chain length (or molecular weight) and above which the viscosity is proportional to the molecular weight raised to the power of 3.4 (see D. Tabor, "Gases, liquids and solids and other states of matter", p340, $3^{rd}$ Ed., 1991 (Cambridge University Press); and J. M. G. Cowie, "Polymers: Chemistry and Physics of Modern Materials", p251, $2^{nd}$ Ed., 1991 (Blackie and Son Ltd). In this way, the polymer coating will provide the desired heat-sealing properties in the final film. It is not, however, the inventors' intention to be bound by this theory.

The advantages of the process of the present invention include: the thinner heat-sealable coating layers that are achievable; increased efficiency and economy of manufacture using an in-line process; the absence of residual solvent in the coating of the polymeric film; good heat-seal bond strength of the resultant coated film whilst retaining good peelability (i.e. resistance to tearing); the provision of optically clear, low haze films; and the windability and subsequent processability of the coated films.

As used herein, the term "melt-coating" refers to a coating method characterised in that;

(i) a coating liquid is forced through a coating die onto a substrate so as to provide a uniform liquid flow rate over the width of the coating die;

(ii) said coating die comprises a distribution chamber, a feed slot, and downstream and upstream die lips, wherein said feed slot separates said downstream and upstream die lips, and wherein the domain bounded by the die lips and the substrate defines a coating gap;

(iii) the coating gap under the downstream die lip is filled by the coating liquid; and (iv) the coating gap under the upstream die lip is unfilled, partially filled or completely filled by the coating liquid, but is preferably partially or completely filled by the coating liquid.

The coating gap in the melt-coating method is small in relation to that in other coating methods such as extrusion-coating. The coating gap in melt-coating is preferably between 2 and 10 times the thickness of the wet coating layer. In some cases, the coating gap can be less than twice, or more than 10 times, the thickness of the wet coating layer, depending on factors such as the viscosity of the coating liquid, the line speed of coating, and the dimensions and geometry of the coating die. Melt-coating methods and the equipment useful therefor are described in more detail by Franz Durst and Hans-Gunte Wagner (ibid; in which melt-coating is referred to as "slot-coating"), the disclosure of which is incorporated herein by reference.

In melt-coating, the viscosity of the molten coating liquid at the point of application to the substrate must not be too high otherwise the polymer will not flow properly, resulting in difficulties in coating and uneven coat thicknesses. Preferably the viscosity of the coating layer polymer at the processing temperature is no more than about 50 Pa.s, preferably no more than about 30 Pa.s, more preferably no more than about 20 Pa.s, and is typically at least 0.005 Pa.s, preferably at least 0.1 Pa.s, more preferably at least 1 Pa.s, more preferably at least 2 Pa.s, more preferably at least 5 Pa.s and particularly at least 10 Pa.s. Typical operating temperatures at which the polymer should exhibit such melt viscosities are in the range of 200 to 260° C., particularly 220 to 250° C., and more particularly 230 to 250° C.

In the melt-coating process of the present invention, the coating liquid is applied from the coating die directly onto the substrate which it is desired to coat.

As used herein, the term "heat-sealable peelable film" refers to a film which is capable of forming a seal to a surface under the application of heat, wherein the seal is breakable without fracture of the film.

The preferred copolyester of the coating layer may be obtained by condensing one or more dicarboxylic acids or their lower alkyl (up to 14 carbon atoms) diesters with one or more glycol(s), particularly an aliphatic or cycloaliphatic glycol, preferably an aliphatic glycol, and more preferably an alkylene glycol.

Suitable dicarboxylic acids-include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. It is preferred that the copolyester is derived from at least two dicarboxylic acids. Preferably, the copolyester comprises an aromatic dicarboxylic acid and an aliphatic dicarboxylic acid. A preferred aromatic dicarboxylic acid is terephthalic acid. Preferred aliphatic dicarboxylic acids are selected from sebacic acid, adipic acid and azelaic acid. A particularly preferred aliphatic diacid is sebacic acid. The concentration of the aromatic dicarboxylic acid present in the copolyester is preferably in the range from 40 to 70, more preferably 45 to 60, and particularly 50 to 55 mole % based on all the dicarboxylic acid components of the copolyester. The concentration of the aliphatic dicarboxylic acid present in the copolyester is preferably in the range from 30 to 60, more preferably 40 to 55, and particularly 45 to 50 mole % based on all the dicarboxylic acid components of the copolyester.

The glycol component of the copolyester of the coating layer preferably contains from 2 to 8, more preferably 2 to 4 carbon atoms. Suitable glycols include ethylene glycol, 1,3-propanediol, 1,3-butane diol, 1,4-butanediol, 1,5-pentane diol, neopentyl glycol, 2,2-dimethyl-1,3-propanediol, diethylene glycol, triethylene glycol and 1,4-cyclohexanedimethanol. An aliphatic glycol, particularly ethylene glycol or 1,4-butanediol, is preferred. In a particularly preferred embodiment, the aliphatic glycol is 1,4-butanediol.

Particularly preferred examples of the copolyesters of the coating layer are (i) copolyesters of azeleic acid and terephthalic acid with an aliphatic glycol, preferably ethylene glycol, and preferably wherein the ratio of azeleic acid/terephthalic acid/aliphatic glycol is 40–50/60–50/100; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol, and preferably wherein the ratio of sebacic acid/terephthalic acid/aliphatic glycol is 45–55/55–45/100. Particularly preferred are copolyesters of sebacic acid and terephthalic acid with an aliphatic glycol, preferably butylene glycol.

Formation of the copolyester is conveniently effected in known manner by condensation, or ester-interchange, at temperatures generally up to 275° C.

The polymer of the coating layer preferably has a glass transition point of less than 10° C., more preferably less than 0° C., particularly in the range from −50° C. to 0° C., and especially −50° C. to −10° C., in order to provide good peelability and minimise the risk of tear.

The polymer of the coating layer preferably has a melting point in the range from 90° C. to 250° C., more preferably 110° C. to 175° C., and particularly 110° C. to 155° C., in order to obtain an adequate heat-seal bond.

In one embodiment, the copolyester is a copolyester of azeleic acid/terephthalic acid/ethylene glycol (45/55/100) having a Tg of −15° C. and a $T_m$ of 150° C. A particularly preferred copolyester is a copolyester of sebacic acid/terephthalic acid/butylene glycol (50/50/100) having a glass transition point ($T_g$) of −40° C. and a melting point ($T_m$) of 117° C.

The preferred copolyesters of the coating layer as described herein will typically provide a non-amorphous layer. The degree of crystallinity of such layers will be at least 5%, preferably at least 10%, preferably at least 20%, and more preferably at least 30%.

The substrate is a self-supporting film or sheet by which is meant a film or sheet capable of independent existence in the absence of a supporting base. The substrate may be formed from any suitable film-forming material. Thermoplastic polymeric materials are preferred. Such materials include a homopolymer or copolymer of a 1-olefin, such as ethylene, propylene and but-1-ene, a polyamide, a polycarbonate, PVC, PVA, polyacrylates, celluloses and particularly a synthetic linear polyester.

The synthetic linear polyesters useful as the substrate may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic or cycloaliphatic glycol, eg ethylene glycol, 1,3-propanediol, 1,4-butanediol, neopentyl glycol and 1,4-cyclohexanedimethanol. An aliphatic glycol is preferred.

In a preferred embodiment, the polyester is selected from polyethylene terephthalate and polyethylene naphthalate. Polyethylene terephthalate (PET) is particularly preferred.

The substrate may also comprise a polyarylether or thio analogue thereof, particularly a polyaryletherketone, polyarylethersulphone, polyaryletheretherkeetone, polyaaryletherethersulphone, or a copolymer or thioanalogue thereof. Examples of these polymers are disclosed in EP-A-001879, EP-A-0184458 and U.S. Pat. No. 4,008,203. Blends of such polymers may also be employed.

Thermoset resin polymeric materials suitable for use as the substrate include addition-polymerisation resins, such as acrylics, vinyls, bis-maleimides and unsaturated polyesters; formaldehyde condensate resins, such as condensates with urea, melamine or phenols, cyanate resins, functionalised polyesters, polyamides or polyimides.

The substrate may comprise one or more discrete layers of the above film-forming materials. The polymeric materials of the respective layers may be the same or different. For instance, the substrate may comprise one, two, three, four or five or more layers and typical multilayer structures may be of the AB, ABA, ABC, ABAB, ABABA or ABCBA type.

In one embodiment, the substrate comprises two discrete layers, layer A and layer B, wherein layer B is the layer onto which the coating composition is applied and layer A is the layer most remote from the coating composition. In this embodiment, layer B may comprise a polymer which itself has heat-sealability. In other words, the polymer of layer B softens at a temperature which is less than the melting temperature of layer A. In one embodiment, the polymer of layer B should begin to soften at a temperature which is between about 5 and 50° C. below, preferably between about 5 and 30° C. below, and preferably at least about 10° C. below the melting temperature of the polymer material of layer A. Layer A suitably comprises a polyester, preferably polyethylene terephthalate. Layer B suitably comprises a polyester, particularly a copolyester, and particularly a copolyester derived from one or more of the dicarboxylic acid(s) or their lower alkyl diesters with one or more of the glycol(s) referred to herein.

In a preferred embodiment, layer B of a bi-layer substrate comprises a copolyester derived from an aliphatic glycol and at least two dicarboxylic acids, particularly aromatic dicarboxylic acids, preferably terephthalic acid and isophthalic acid. A preferred copolyester is derived from ethylene glycol, terephthalic acid and isophthalic acid. The preferred molar ratios of the terephthalic acid component to the isophthalic acid component are in the range of from 50:50 to 90:10, preferably in the range from 65:35 to 85:15. In a preferred embodiment, this copolyester is a copolyester of ethylene glycol with about 82 mole % terephthalate and about 18 mole % isophthalate.

In an alternative preferred embodiment, layer B of a bi-layer substrate comprises a copolyester derived from an aliphatic diol and a cycloaliphatic diol with one or more, preferably one, dicarboxylic acid(s), preferably an aromatic dicarboxylic acid. Examples include copolyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65. In a preferred embodiment this copolyester is a copolyester of terephthalic acid with about 33 mole % 1,4-cyclohexane dimethanol and about 67 mole % ethylene glycol. An example of such a polymer is PETG™6763 (Eastman) which comprises a copolyester of terephthalic acid, about 33% 1,4-cyclohexane dimethanol and about 67% ethylene glycol and which is always amorphous. In an alternative embodiment of the invention, the polymer of layer B may comprise butane diol in place of ethylene glycol.

The thickness of layer B is generally between about 1 and 30%. of the thickness of the layer A. Layer B may have a thickness of up to about 50 μm, preferably up to about 25 μm, more preferably up to about 15 μm, more preferably up to about 10 μm, more preferably between about 0.5 and 6 μm, and more preferably between about 0.5 and 4 μm.

The embodiment wherein the substrate is a bi-layer AB structure is particularly advantageous when a stronger heat-seal bond, with retention of good peelability, is required. Heat-seal strengths of a coated film comprising such a bi-layer substrate are typically in the upper portion of the range referred to herein, i.e. such bi-layer substrates typically provide heat-seal strengths of about 1200 g/25 mm². Typical values for a mono-layer substrate having a corresponding thickness of coating layer composition are about 800 g/25 mm².

The coated films comprising a bi-layer substrate, in comparison with coated films comprising a mono-layer substrate, therefore allow for a reduction in the amount of coating layer composition required for a given strength of heat-seal bond. Because the polymer material of the coating layer is generally more costly than the polymer material used for layer B in the bi-layer substrate described herein, the coated films comprising a bi-layer substrate therefore have the added advantage of being more economical to produce when compared with coated films comprising a coated mono-layer substrate.

In comparison with uncoated heat-sealable films, for example a heat-sealable film comprising only an uncoated bi-layer AB substrate as described above, the coated films of the present invention have the advantage or providing a heat-seal bond which is both strong and easily-peelable without tearing.

Formation of the substrate may be effected by conventional techniques well-known in the art. Conveniently, formation of the substrate is effected by extrusion, in accordance with the procedure described below. In general terms the process comprises the steps of extruding a layer of molten polymer, quenching the extrudate and orienting the quenched extrudate in at least one direction.

The substrate may be uniaxially oriented, but is preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process.

In the preferred flat film process, the substrate-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Alternatively, the cast film may be stretched simultaneously in both the forward and transverse directions in a biaxial stenter. Stretching is effected to an extent determined by the nature of the polyester, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 70 to 125° C. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. In applications where film shrinkage is not of significant concern, the film may be heat set at relatively low temperatures or not at, all. On the other hand, as the temperature at which the film is heat set is increased, the tear resistance of the film may change. Thus, the actual heat set temperature and time will vary depending on the composition of the film but should not be selected so as to substantially degrade the tear resistant properties of the film. Within these constraints, a heat set temperature of about 135° to 250° C. is generally desirable, as described in GB-A-838708.

Where the substrate comprises more than one layer, preparation of the substrate is conveniently effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a multilayer polymeric film, which may be oriented and heat-set as hereinbefore described. Formation of a multilayer substrate may also be effected by conventional lamination techniques, for example by laminating together a preformed first layer and a preformed second layer, or by casting, for example, the first layer onto a preformed second layer.

The substrate is suitably of a thickness between about 5 and 350 $\mu$m, preferably from 9 to about 150 $\mu$m and particularly from about 12 to about 40 $\mu$m.

The dry thickness of the coating layer is desirably from about 0.1 $\mu$m to about 8 $\mu$m, preferably from about 0.5 $\mu$m to about 8.0 $\mu$m, more preferably from about 0.5 $\mu$m to about 5 $\mu$m, and desirably about 1.0 $\mu$m to about 2.5 $\mu$m. Generally the coating layer is in the range of about 1.5 to about 2.0 $\mu$m. As noted above, a thicker coating layer generally produces a stronger heat-seal bond.

It is preferred that the coating composition should be applied to the film substrate between the two stages (longitudinal and transverse) of a biaxial stretching operation. Such a sequence of stretching and coating is especially preferred for the production of a coated linear polyester film substrate which is preferably firstly stretched in the longitudinal direction over a series of rotating rollers, coated with the coating composition, and then stretched transversely in a stenter oven, preferably followed by heat setting.

Prior to deposition of the coating composition onto the polymeric substrate, the exposed surface thereof may, if desired, be subjected to a chemical or physical surface-modifying treatment to improve the bond between that surface and the subsequently applied coating composition. A preferred treatment, because of its simplicity and effectiveness, which is particularly suitable for the treatment of a polyolefin substrate, is to subject the exposed surface of the substrate to a high voltage electrical stress accompanied by corona discharge. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface.

One or more of the layers of the polymeric film, i.e. the substrate and/or the coating layer, may conveniently contain any of the additives conventionally employed in the manufacture of polymeric films. Thus, agents such as cross-linking agents, dyes, pigments, voiding agents, lubricants, anti-oxidants, radical scavengers, UV absorbers, thermal stabilisers, anti-blocking agents, surface active agents, slip aids, optical brighteners, gloss improvers, prodegradents, viscosity modifiers and dispersion stabilisers may be incorporated in the substrate and/or coating layer(s) as appropriate. In particular the substrate and/or coating layer may comprise a particulate filler which may, for example, be a particulate inorganic filler or an incompatible resin filler or a mixture of two or more such fillers.

By an "incompatible resin" is meant a resin which either does not melt, or which is substantially immiscible with the polymer, at the highest temperature encountered during extrusion and fabrication of the film. The presence of an incompatible resin usually results in a voided layer, by which is meant that the layer comprises a cellular structure containing at least a proportion of discrete, closed cells. Suitable incompatible resins include polyamides and olefin polymers, particularly a homo- or co-polymer of a mono-alpha-olefin containing up to 6 carbon atoms in its molecule. Preferred materials include a low or high density olefin homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the polymer layer.

Preferred particulate inorganic fillers include titanium dioxide and silica

Titanium dioxide particles may be of anatase or rutile crystal form. The titanium dioxide particles preferably comprise a major portion of rutile, more preferably at least 60%. by weight, particularly at least 80%, and especially approximately 100% by weight of rutile. The particles can be prepared by standard procedures, such as the chloride process or the sulphate process. The titanium dioxide particles may be coated, preferably with inorganic oxides such as aluminium, silicon, zinc, magnesium or mixtures thereof. Preferably the coating additionally comprises organic compound(s), such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds. The coating is suitably applied to the titanium dioxide particles in aqueous suspension, as known in the art. The coating layer on the titanium dioxide particles preferably contains from 1 to 12% of inorganic oxides, and from 0.5 to 3% of organic compound, by weight based upon the weight of titanium dioxide.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 $\mu$m, more preferably 0.05 to 1.5 $\mu$m, and particularly 0.15 to 1.2 $\mu$m. Preferably at least 90%, more preferably at least 95% by volume of the inorganic filler particles are within the range of the volume distributed median particle diameter ±0.8 $\mu$m, and particularly ±0.5 $\mu$m. Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

If employed in the heat-sealable coating layer, the filler particles may comprise from about 0% to about 200% by weight of the coating layer relative to the weight of the polymer of the coating layer.

Advantageously, the coating layer may also comprise an anti-blocking agent, such as behenamide or an oleoamide in order to improve the final properties of the film. The antiblocking agent is generally blended with the polymer of the coating composition prior to introduction in to the hopper of the melt-coater, and is typically present at levels of up to about 5% by weight of the polymer.

For certain coating compositions, handling is improved by the application of additional antiblocking agents. Advantageously, therefore, an antiblocking agent such as a solution of carnuba wax (typically at a concentration of about 14%) is over-coated onto the coated film substrate prior to the second stretching operation.

The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

In one embodiment, the substrate layer of the present invention is optically clear, preferably having a % of scattered visible light (haze) of <10%, preferably <6%, more preferably <3.5% and particularly <2%, measured according to the standard ASTM D 1003. In this embodiment, filler is typically present in only small amounts, generally not exceeding 0.5% and preferably less than 0.2% by weight of the substrate.

In an alternative embodiment, the substrate layer is opaque and highly filled, preferably exhibiting a Transmission Optical Density (TOD) (Sakura Densitometer; type PDA 65; transmission mode) in the range from 0.1 to 2.0, more preferably 0.2 to 1.5, more preferably from 0.25 to 1.25, more preferably from 0.35 to 0.75 and particularly 0.45 to 0.65. The substrate layer is conveniently rendered opaque by incorporation into the polyester blend of an effective amount of an opacifying agent. Suitable opacifying agents include an incompatible resin filler, a particulate inorganic filler or a mixture of two or more such fillers, as hereinbefore described. The amount of filler present in an opaque substrate layer is preferably in the range from 1% to 30%, more preferably 3% to 20%, particularly 4% to 15%, and especially 5% to 10% by weight, based on the weight of the substrate layer polymer. The surface of an opaque substrate layer preferably exhibits a whiteness index, measured as herein described, in the range from 60 to 120, more preferably 80 to 110, particularly 90 to 105, and especially 95 to 100 units.

To improve wetting and levelling properties of the coating composition on a polymeric film substrate, it is desirable that the surface energy of the coating composition is less than that of the film substrate. Suitable reduction in surface tension can be achieved by the addition of one or more surface active agents to the coating composition.

The surface of the substrate which is coated with the coating composition according to the first aspect of the invention is referred to herein as the primary side. The side of the substrate which is not coated with this coating composition is referred to herein as the secondary side. The secondary side of the substrate may have thereon one or more further polymeric layers or coating materials. Any coating of the secondary side is preferably performed "in-line".

In one embodiment the additional coating on the secondary side may comprise a "slip coating" in order to improve the handling and windability of the film, particularly when the film substrate is a polyester substrate. A suitable slip coating may be, for instance a discontinuous layer of an acrylic and/or methacrylic polymeric resin optionally further comprise a cross-linking agent, such as described in EP-A-0408197, the disclosure of which is incorporated herein by reference. An alternative slip coating may comprise a potassium silicate coating, for instance as disclosed in U.S. Pat. Nos. 5,925,428 and 5,882,798, the disclosures of which are incorporated herein by reference.

In a second aspect, the invention further provides a heat-sealable polymeric film comprising a substrate layer of polymeric material having on a surface thereof a heat-sealable copolyester-containing coating layer wherein the thickness of the coating layer is less than about 8 microns.

A polymeric film according to the invention is useful for sealing or providing a lid on a container, such as a thermoformed tray, thermoformed bowl or blow-moulded bottle. The container may be formed of polyester, such as polyethylene terephthalate, or of polypropylene, polystyrene, or may be PVDC coated, or may be glass. A film according to the invention is particularly suitable for use as a lid for an APET/CPET container, especially a thermoformed tray, which is suitable for packaging food or drink. Other suitable types of container include a foil tray (particularly an aluminium foil tray), a metallised tray and a tray formed from PET-coated cartonboard or paperboard. Of particular utility are trays formed from metallised (particularly flash-metallised) PET cartonboard. For example, the tray may be produced from PET which has been metallised to an optical density in the range of about 0.01 to 4.0 and which is laminated to cartonboard. In one embodiment, the tray is a susceptor tray made from materials such as those disclosed in GB-A-2280342, EP-A-0563442 or GB-A-2250408, or is a susceptor tray produced in accordance with the disclosures of these documents, which are incorporated herein by reference.

A coated film obtainable by the process described herein typically exhibits a heat-seal strength, measured as described herein, in the range of 250 to 1800 g/25 mm² when sealed to a standard APET/CPET tray. It is preferred that the heat seal strength is at least 400, preferably at least 600, preferably at least 700 and more preferably at least 800 g/25 mm² when sealed to a standard APET/CPET tray. Preferably, the heat-seal strength of the coated film to APET/CPET trays is in the range of 800–1500 g/25 mm², preferably 800–1200 g/25 mm², in order to provide a peelable heat-seal bond.

Sealing of the container is effected by techniques well-known to those skilled in the art. Once the contents to be packaged have been introduced into the container, the heat-sealable film lid is placed upon the container such that the heat-sealable layer of the film is in contact with the container, and is affixed using temperature and/or pressure using conventional techniques and equipment.

In a third aspect, the invention further provides a sealed container comprising a receptacle containing food or drink, and a lid formed from a polymeric film according to the second aspect of the invention as defined herein.

The following test methods may be used to characterise the polymeric film:

(i) Wide angle haze is measured using a Hazegard System XL-211, according to ASTM D 1003-61.

(ii) Whiteness index is measured using a Colorgard System 2000, Model/45 (Pacific Scientific) based on the principles described in ASTM D313.

(iii) Heat-seal strength is measured by the following procedure. The coated film was sealed, by means of the coating layer, to a standard APET/CPET tray using a Microseal PA 201 (Packaging Automation Ltd, England) tray sealer at a temperature of 180° C., and pressure of 80 psi for one second. Strips of the sealed film and tray were cut out at 90° to the seal, and the load required to pull the seal apart was measured using an Instron Model 4301 operating at a crosshead speed of 0.2 mmin$^{-1}$. The procedure was repeated and a mean value of 5 results calculated.

(iv) Melt viscosity may be measured by parallel plate viscometry according to conventional techniques. Samples were placed in a Rheometrics rheometer between two 40 mm diameter parallel plates and heated to the measurement temperature (a temperature equivalent to that of the processing temperatures used in melt-coating the polymer (typically 200 to 260° C.)). The sample was compressed to remove any voids until a separation of between 1 and 2 mm was reached. Any excess material was removed from the edges. Melt viscosity measurements were made in the shear-independent plateau region (typically in the frequency range $10^{-4}$ to $10^3$ rads/sec).

(v) The degree of crystallinity is the mass or volume fraction of the polymer which exists in the crystalline state, the remainder being present as the amorphous state ("Polymer Physics"; Ulf W. Gedde; Chapman and Hall; 1995; p157). (Thus, a degree of crystallinity of 20% refers to a polymer wherein 20% of the mass or volume exists as crystalline structures.) Conveniently, the degree of crystallinity of a polymeric layer is derived from density measurements. Initially, two density measurements for a given polymeric material are obtained for two samples having two known (different) values of crystallinity. Conveniently, one density is measured for a sample having 0% crystallinity (the amorphous density), which is readily obtained by measuring the density of the molten polymer using conventional techniques. The second density value is that measured for a sample of the polymer for which the crystallinity has been measured by powder X-ray diffraction techniques, usually in combination with differential scanning calorimetry (DSC) techniques. The linear relationship between density and crystallinity enables these data to be used to calculate the crystallinity of further samples of the polymer on the basis of density measurements. The thickness of the polymer layer is measured by standard techniques (for instance, by ellipsometry or reflectometry). The mass of the polymer layer is then measured (for instance by washing the coating off a specific area of film and calculating the weight difference before and after). A value for the density of the polymer layer can then be calculated. A value for the degree of crystallinity of the layer can then be calculated using the previously measured density values for known degrees of crystallinity.

Figure 2:
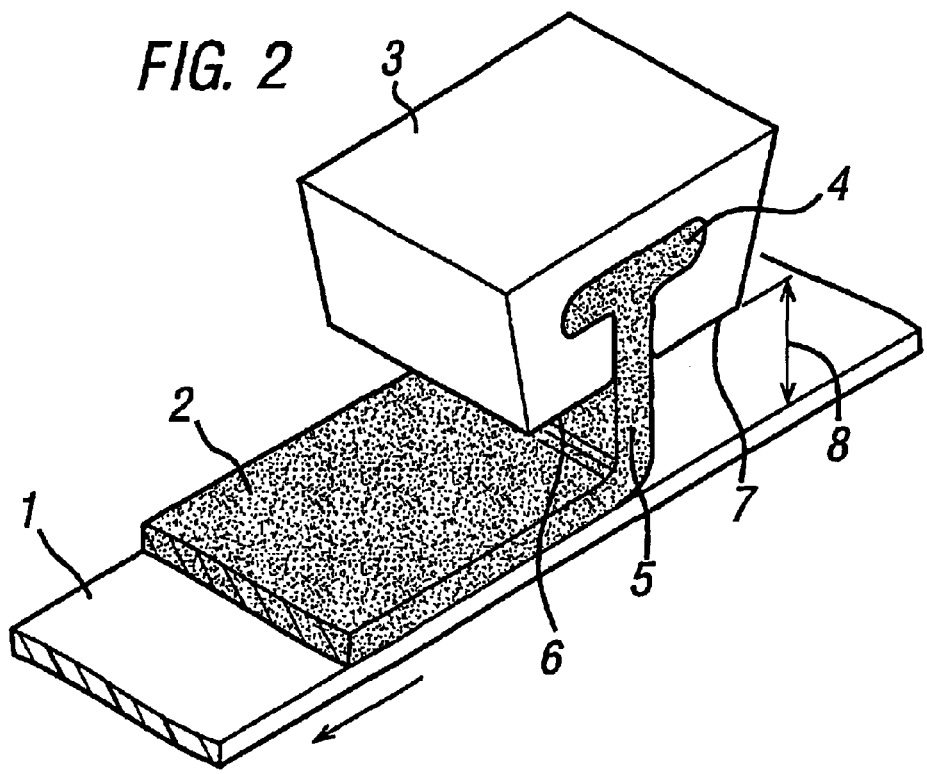

The invention is illustrated by reference to FIG. 1 which shows a polymeric substrate (1) being melt-coated with a coating liquid (2) from a coating die (3), said die comprising a distribution chamber (4), a feed slot (5), a downstream lip (6) and an upstream lip (7). The substrate (1) and the die lips (6,7) define a coating gap (8), in which there is formed a coating bead (9). The film is moving in the direction shown by the arrow. For the purpose of comparison, an extrusion-coating arrangement is shown in FIG. 2, the numbering of the elements corresponding to that of FIG. 1.

The invention is further illustrated by the following examples. It will be appreciated that the examples are for illustrative purposes only and are not intended to limit the invention as described above. Modification of detail may be made without departing from the scope of the invention.

EXAMPLES

Example 1

In the preparation of the coated films of the present invention, a melt-coating die was situated between the forward draw rolls and the stenter oven in which takes place the sideways draw. In this example, the coating composition comprised a copolyester of sebacic acid/terephthalic acid/butylene glycol (50/50/100) having a glass transition point ($T_g$) of –40° C., a melting point ($T_m$) of 117° C. and an initial melt viscosity of about 70 Pa.s at 240° C. The copolyester was blended with an antiblock agent (behenamide) and approximately 1300 ppm water, as described herein. The addition of the water rapidly reduced the melt viscosity of the copolyester to about 10 Pa.s at 240° C.

A polymer composition comprising polyethylene terephthalate was melt-extruded, cast onto a cooled rotating drum and stretched in the direction of extrusion to approximately 3 times its original dimensions. The cooled stretched film was then melt-coated on one side with the copolyester composition to give a wet coating thickness of 8 μm. The coated film was passed into a stenter oven at a temperature of 100° C. where the film was dried and stretched in the sideways direction to approximately 3 times its original dimensions. The biaxially stretched coated film was heat-set at a temperature of about 230° C. by conventional means. The total thickness of the final film was 25 μm; dry thickness of the coating layer was about 1.5–2 microns. The film was a clear film. The haze of the film was measured, using the procedure described above, to be 6%. The heat-seal strength of the film to an APET/CPET tray was measured, using the procedure described above, to be 850 g/25 mm².

Example 2

A coated film was prepared in the manner of Example 1 using a copolyester of azeleic acid/terephthalic acid/ethylene glycol (45/55/100) having a $T_g$ of –15° C. and a $T_m$ of 150° C. In order to minimise blocking, the melt coated film was over-coated prior to entry into the stenter oven with a 14% Carnuba wax solution. The total thickness of the final film was 25 μm; dry thickness of the coating layer was about 1.5–2 microns. This copolyester crystallises after film manufacture. The average haze value was about 22%. The heat-seal strength of the film to an APET/CPET tray was measured, using the above procedure, at 850 gms/25 mm².

What is claimed is:

1. A process comprising the steps of:
    (a) melt-extruding a substrate layer of polymeric material;
    (b) stretching the substrate layer in a first direction;
    (c) optionally stretching the substrate layer in a second, orthogonal direction;
    (d) optionally heat-setting the stretched substrate layer;
    (e) forming a heat-sealable coating layer on a surface of the substrate layer by melt-coating directly thereon a molten polymeric material; and
    (f) cooling the coated substrate layer,
    wherein coating step (e) is prior to step (b) or between steps (b) and (c);
    wherein the thickness of the coating layer is less than about 8 μm; and
    wherein the molten polymeric material of the coating layer comprises a copolyester.

2. A process according to claim 1 wherein the substrate layer comprises polyester.

3. A process according to claim 1 wherein the substrate layer comprises poly(ethylene terephthalate).

4. A process according to claim 1 wherein the substrate layer comprises a layer A and a layer B, wherein layer B is the layer onto which the coating layer composition is applied, wherein layer A comprises polyethylene terephthalate and layer B comprises a copolyester derived from one or more dicarboxylic acid(s) and one or more glycol(s).

5. A process according to claim 4 wherein layer B comprises a copolyester derived from ethylene glycol, terephthalic acid and isophthalic acid.

6. A process according to claim 5 wherein the molar ratio of the terephthalic acid component to the isophthalic acid component is in the range from 65:35 to 85:15.

7. A process according to claim 5 wherein the molar ratio of the terephthalic acid component to the isophthalic acid component is about 82:18.

8. A process according to claim 4 wherein layer B comprises a copolyester derived from terephthalic acid, ethylene glycol and 1,4-cyciohexanedimethanol.

9. A process according to claim 8 wherein the molar ratio of 1,4-cyclohexanedimethanol to ethylene glycol is in the range from 30:70 to 35:65.

10. A process according to claim 8 wherein the molar ratio of 1,4-cyclohexanedimethanol to ethylene glycol is about 33:67.

11. A process according to claim 1 wherein the coating layer comprises a copolyester derived from an aromatic dicarboxylic acid, an aliphatic dicarboxylic acid and a stoichiometric amount of one or more glycols.

12. A process according to claim 11 wherein the concentration of said aromatic dicarboxylic acid in the copolyester is in the range from 40 to 70 mol % based on all the dicarboxylic acid components of the copolyester, and the concentration of said aliphatic dicarboxylic acid in the copolyester is in the range from 30 to 60 mol % based on all the dicarboxylic acid components of the copolyester.

13. A process according to claim 11 wherein the concentration of said aromatic dicarboxylic acid in the copolyester is in the range from 50 to 55 mol % based on all the dicarboxylic acid components of the copolyester, and the concentration of said aliphatic dicarboxylic acid in the copolyester is in the range from 45 to 50 mol % based on all the dicarboxylic acid components of the copolyester.

14. A process according to claim 11, 12 or 13 wherein said aromatic dicarboxylic acid is terephthalic acid.

15. A process according to any one of claims 11, 12 and 13 wherein said aliphatic dicarboxylic acid is selected from sebacic acid, adipic acid and azelaic acid.

16. A process according to any one of claims 11, 12 and 13 wherein said aliphatic dicarboxylic acid is sebacic acid.

17. A process according to any one of claims 11, 12 and 13 wherein the glycol component of the copolyester of the coating layer is an aliphatic glycol.

18. A process according to any of claims 11, 12 and 13 wherein the glycol component of the copolyester of the coating layer is 1,4-butanediol.

19. A process according to any of claims 11, 12 and 13 wherein the coating layer comprises a polymer selected from:
(i) copolyesters of azelaic acid and terephthalic acid with an aliphatic glycol;
(ii) copolyesters of adipic and terephthalic acid with an aliphatic glycol;
(iii) copolyesters of sebacic acid and terephthalic acid with an aliphatic glycol.

20. A process according to claim 19 wherein the aliphatic glycol is ethylene glycol.

21. A process according to claim 1 wherein the coating layer comprises a polymer selected from:
(i) a copolyester of sebacic acid/terephthalic acid/butylene glycol in a mol % ratio of (50/50/100) and having a glass transition point ($T_g$) of −40° C. and a melting point ($T_m$) of 117° C.; and
(ii) a copolyester of azelaic acid/terephthalic acid/ethylene glycol in a mole % a ratio of (45/55/100) and having a $T_g$ of −15° and a $T_m$ of 150° C.

22. A process according to claim 1 wherein the viscosity of the molten polymeric material of the coating layer is in the range of 0.005 to 50 Pa.s.

23. A process according to claim 1 wherein the viscosity of the molten polymer material of the coating layer is in the range of 0.005 to 30 Pa.s.

24. A process according to claim 1 further comprising adding water to the polymeric material of the coating layer prior to the coating step, wherein said water is added in an amount in the range of from about 600 ppm to about 2500 ppm by weight of the copolyester of the coating layer.

25. A process according to claim 24 wherein water is added in an amount in the range of about 1000 ppm to about 2000 ppm.

26. A process according to claim 24 wherein water is added in an amount in the range of about 1300 ppm to about 1600 ppm.

27. A process according to claim 1 wherein the substrate layer is stretched in said orthogonal direction and said step (e) is conducted between said steps (b) and (c).

* * * * *